Oct. 29, 1940.　　　R. H. WORRALL　　　2,219,351
SIGNALING DEVICE FOR MOTOR VEHICLES
Filed Feb. 28, 1938
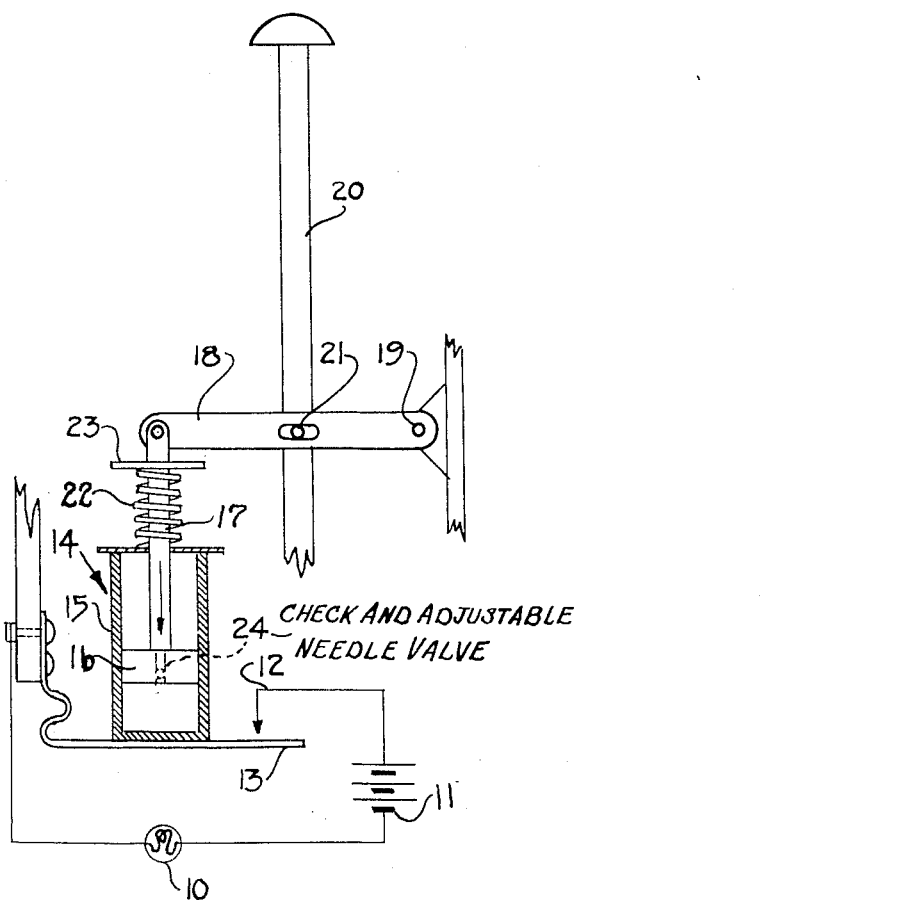
INVENTOR
ROBERT H. WORRAL
BY
*Ransom K. Davis*
ATTORNEY

UNITED STATES PATENT OFFICE 2,219,351

SIGNALING DEVICE FOR MOTOR VEHICLES

Robert H. Worrall, Washington, D. C.

Application February 28, 1938, Serial No. 193,021

1 Claim. (Cl. 177—339)

(Granted under the act of March 3, 1883, as amended April 30, 1928; 370 O. G. 757)

This invention relates to signaling devices for motor vehicles and it has a particular relation to the control of the circuits of the stop or warning lamps thereof.

In operating a motor vehicle it is usually the practice for the driver in decreasing speed to first release the pressure on the foot throttle or accelerator and if a further reduction in speed is desired, as when coming to a full stop, the foot brakes are subsequently applied. The foot brakes are generally constructed so as to close the circuit of the stop or warning lamp and to illuminate the same when the brakes are applied but thus far no attempt has been made to indicate that the speed of the vehicle is to be reduced by merely decreasing the flow of fuel to the engine.

The principal object of the present invention is the provision of means for controlling the circuit of a stop or warning lamp of a motor vehicle in such manner as to cause the lamp to be illuminated when the operator decides to reduce the speed of the vehicle by decreasing the pressure on the foot throttle.

Another object of the invention is the provision of a device operable by the foot throttle when pressure thereon is decreased for closing the circuit of the stop or warning lamp and which will automatically open said circuit after a time interval of predetermined duration elapses even though the pressure on the throttle may not be further decreased.

With these and other objects in view, as well as other advantages that may be incident to the use of the improvements, the invention consists in the parts and combinations thereof hereinafter set forth and claimed, and with the understanding that the several necessary elements constituting the same may be varied in proportion and arrangement without departing from the nature and scope of the invention, as defined in the appended claim.

In order to make the invention more clearly understood, there are shown in the accompanying drawing, means for carrying the invention into practical use, without limiting the improvements in their useful application to the particular construction, which, for the purpose of explanation, have been made the subject of illustration.

In the accompanying drawing:

The figure is a diagrammatic view of a signaling device constructed in accordance with the invention.

Referring to the drawing, the invention is shown as embodying a stop or warning lamp 10, energized by a source of electric energy such as a battery 11 and controlled by a switch including a fixed contact 12 and a movable contact in the form of a leaf spring 13. Under normal conditions the movable contact 13 is maintained out of engagement with the fixed contact 12 so as to deenergize the lamp 10, by means of a dash-pot mechanism, indicated generally at 14. This mechanism includes in its construction a cylinder 15 one end of which is disposed in engagement with the movable contact 13 and which houses a piston 16 fixed at one end of a rod 17, the other end of the rod being pivotally connected with one end of a lever 18. The other end of the lever 18 is pivotally mounted as at 19 to the chassis of the vehicle and is actuated by the foot throttle 20 through the medium of a slot and pin connection 21. The piston 16 is normally maintained in the position shown by a spring 22 surrounding the piston rod 17 between the end of the cylinder 15 and a plate 23 fixed to the rod. A check ball valve 24 is provided in the piston 16 so as to permit the piston to move downwardly with little or no resistance, but is restrained in its upward movement. The rate at which air may escape through this valve may be adjusted by means of any suitable needle valve so as to obtain the desired delayed action of the piston in an upward direction.

When the operator depresses the foot throttle 20 the piston 16 is moved downwardly against the action of the spring 22, the air in the lower end of the cylinder escaping freely through the check valve 24 so as to impart little or no movement to the cylinder 15. What small distance that the cylinder 15 may move will only force the movable contact 13 further away from the contact 12. If, now, the operator preparatory to slowing down, releases the throttle 20, even a small amount, the suction created in the lower end of the cylinder 15 will cause the piston and cylinder to move upwardly together and close the contacts 12—13, thus completing the circuit through the tail lamp 10 and energizing the same. The spring 22, however, being under compression, urges the cylinder gradually downwardly at a rate determined by the leakage of the air past the valve 24, until it again engages the contact 13 and flexes it out of engagement with the contact 12, thus interrupting the circuit through the lamp 10. The time interval that the lamp is illuminated may be relatively short and may be only a flash, but it is of sufficient duration to indicate to a following driver of a contemplated change in speed of the preceding vehicle.

The device may, in other respects, be modified in construction and arrangement of the parts by those skilled in the art without departing from the nature and scope of the invention as defined in the appended claim.

The invention described herein may be manufactured and used by or for the Government of the United States of America for governmental purposes without the payment of any royalties thereon or therefor.

I claim:

In a signaling system for motor vehicles wherein a warning lamp is energized by electric current traversing a circuit controlled by a switch operable by a foot pedal movable between released and depressed positions to control the speed of the engine, the combination of a cylinder engageable with said switch, a piston in said cylinder and connected with said pedal, a spring for urging said piston toward one end of said cylinder, and valve mechanism for permitting said piston to move freely toward the other end of said cylinder against the action of said spring while maintaining said switch open when said pedal is depressed to increase the speed of the engine and for retarding the movement of said piston toward the first mentioned end of the cylinder under the action of said spring to permit said switch to close and energize said lamp for a time interval of predetermined duration when said pedal is released to decrease the speed of the engine.

ROBERT H. WORRALL.